US012587376B1

(12) United States Patent
Tu et al.

(10) Patent No.: US 12,587,376 B1
(45) Date of Patent: Mar. 24, 2026

(54) CONTROLLING NETWORK ACCESS USING NEGOTIATED ENCRYPTION PROGRAMS BASED ON RESOURCE REQUIREMENTS

(71) Applicant: Calix, Inc., San Jose, CA (US)

(72) Inventors: Youwu Tu, Nanjing Jiangsu (CN);
Yongsheng Xue, Nanjing Jiangsu (CN);
Tian Deng, Nanjing Jiangsu (CN)

(73) Assignee: Calix, Inc., San Jose, CA (US)

( * ) Notice: Subject to any disclaimer, the term of this patent is extended or adjusted under 35 U.S.C. 154(b) by 175 days.

(21) Appl. No.: 18/529,231

(22) Filed: Dec. 5, 2023

(51) Int. Cl.
*H04L 9/30* (2006.01)
*G06N 5/02* (2023.01)
*H04L 47/80* (2022.01)

(52) U.S. Cl.
CPC .............. *H04L 9/3013* (2013.01); *G06N 5/02* (2013.01); *H04L 47/803* (2013.01)

(58) Field of Classification Search
CPC ........ H04L 9/3013; H04L 47/803; G06N 5/02
See application file for complete search history.

(56) References Cited

U.S. PATENT DOCUMENTS

| | | | | |
|---|---|---|---|---|
| 2002/0152147 A1* | 10/2002 | Shulman | ................ | G06Q 40/00 |
| | | | | 705/35 |
| 2007/0087756 A1* | 4/2007 | Hoffberg | .......... | G06Q 10/06375 |
| | | | | 455/450 |
| 2010/0070380 A1* | 3/2010 | Park | ....................... | G06Q 30/06 |
| | | | | 705/26.1 |
| 2018/0278416 A1* | 9/2018 | Brown | .................. | H04L 9/3033 |
| 2020/0005395 A1* | 1/2020 | Abdollahian | .......... | G06Q 40/06 |

* cited by examiner

*Primary Examiner* — Kristie D Shingles
(74) *Attorney, Agent, or Firm* — Staniford Tomita LLP

(57) ABSTRACT

A component controlling network access between a client and a server. The component determines, based on a first negotiation proposal from the client, a set of programs compatible with the client and determines, based on the set of programs and resources required by each program of the set of programs, a second negotiation proposal. The component sends the second negotiation proposal to the client. In this way, the component determines its negotiation proposal with a consideration of resource requirement of each program in order to avoid resource overload for the component.

17 Claims, 8 Drawing Sheets

500

300

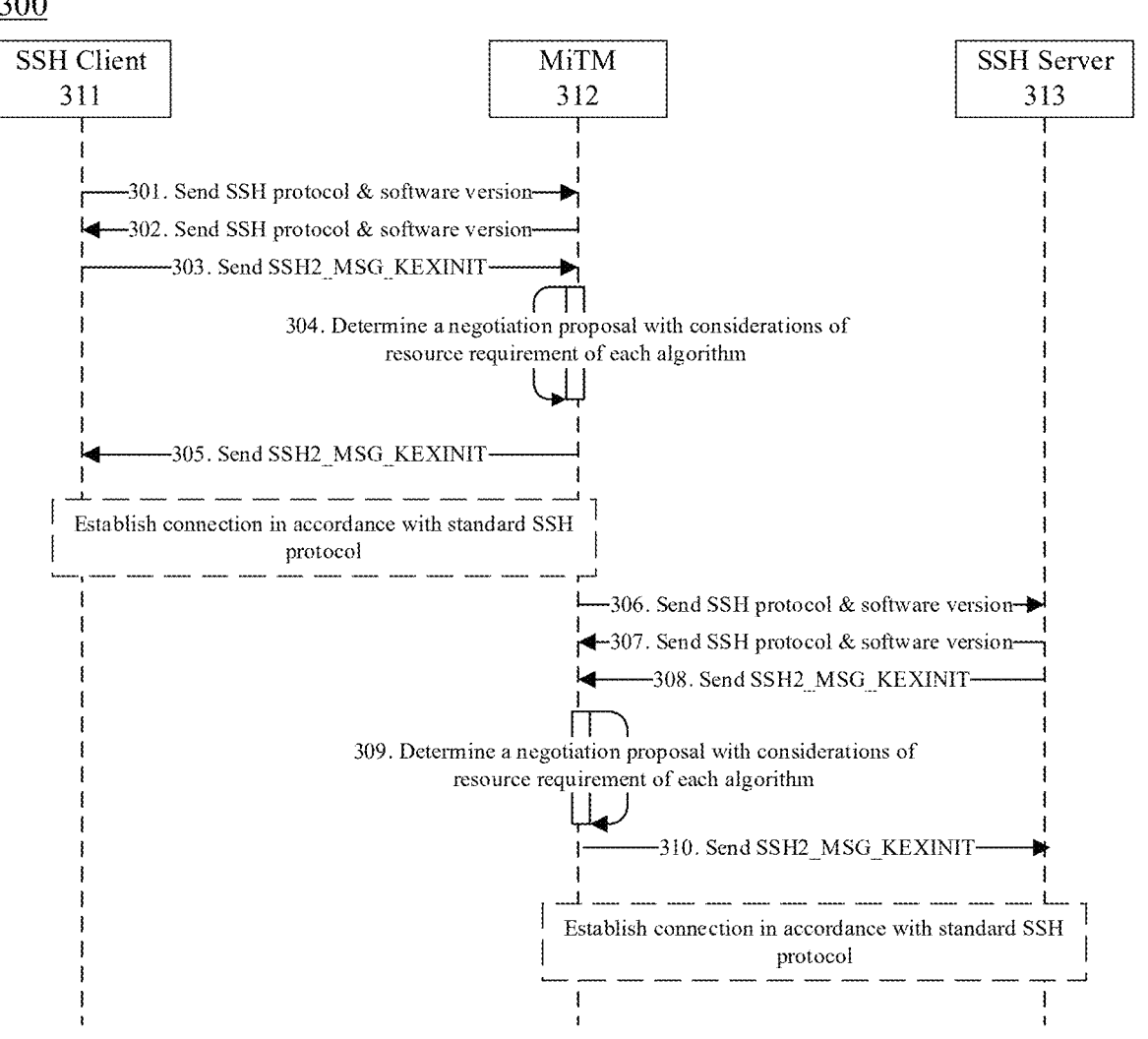

| SSH Client 311 | MiTM 312 | SSH Server 313 |

301. Send SSH protocol & software version→

←302. Send SSH protocol & software version

303. Send SSH2_MSG_KEXINIT→

304. Determine a negotiation proposal with considerations of resource requirement of each algorithm ←305. Send SSH2_MSG_KEXINIT Establish connection in accordance with standard SSH protocol 306. Send SSH protocol & software version→

←307. Send SSH protocol & software version

←308. Send SSH2_MSG_KEXINIT

309. Determine a negotiation proposal with considerations of resource requirement of each algorithm 310. Send SSH2_MSG_KEXINIT→

Establish connection in accordance with standard SSH protocol

CONTROLLING NETWORK ACCESS USING NEGOTIATED ENCRYPTION PROGRAMS BASED ON RESOURCE REQUIREMENTS

TECHNICAL FIELD

Embodiments relate to the field of network access, and more particularly to controlling network access.

BACKGROUND

Data centers and large-scale networks are constantly under threat from various types of cyberattacks such as data theft, hacking, spyware, Man-in-the-Middle attacks, and so on. Strictly controlling network access is important to ensure that system resources (data, applications, processes, etc.) stay adequately protected. Protocols such as secure shell (SSH) and secure sockets layer/transport layer security (SSL/TLS) are widely used in data centers to provide secure management, remote access to resources, software patches and updates.

Imposing strict security controls typically adds management overhead and may force compromises with respect to network accessibility and even performance, in some cases. It is therefore important to provide security enhancements to accommodate different activity use cases and overcome vulnerabilities due to software versioning and to maintain flexible connectivity for security protocols without incurring excessive overhead and/or performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF DRAWINGS

In the following drawings, like reference numerals designate like structural elements. Although the figures depict various examples, the one or more embodiments and implementations described herein are not limited to the examples depicted in the figures.

FIG. 3 is a SSH protocol diagram illustrating establishing SSH connection between a client and MiTM, under an example embodiment.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can be combined, occur, or be performed simultaneously, at the same point in time, or concurrently.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Figure 1:
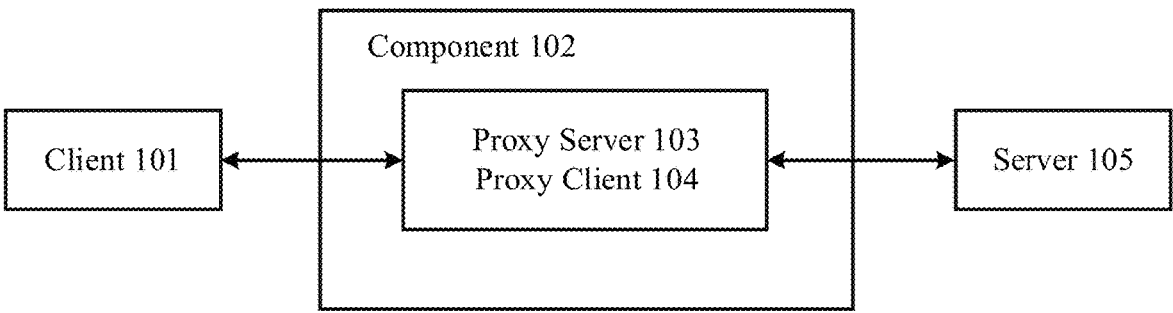
FIG. 1 is a block diagram illustrating an example embodiment of an apparatus for controlling network access.

FIG. 1 is a block diagram illustrating an example embodiment of an apparatus for controlling network access. In illustration 100, component 102 is configured between client 101 and server 105. Component 102 is an intermediary device and acts as a proxy server 103 when it is communicating with client 101, and component 102 acts as a proxy client 104 when it is communicating with server 105. In one embodiment, component 102 is a man in the middle (MiTM) developed for protocols such as secure shell (SSH) or secure sockets layer/transport layer security (SSL/TLS).

Component 102 may be implemented as a hardware component comprising a circuit, a software component executing a software program, or as a firmware component comprising both hardware and software elements. Client 101 and server 105 generally represent computers or processing devices operated by respective users or organizations that are coupled together through a client-server network, such as a local area network (LAN), wide area network (WAN), metropolitan area network (MAN), Internet Protocol (IP) network, cloud network, or any combination of such networks. The network could include different types of links, such as wired links or wireless links. Each device or network element may represent a node in the network and is coupled to at least one or more other nodes for transmission of messages (data packets) in accordance with defined routing protocols. In an embodiment, client 102 may be a remote computer or portable device (e.g., laptop/ notebook computers, tablet computer, mobile phone, and so on), while the server may be a server computer in the network. Embodiments are not so limited, however, and other network topographies and components are also possible.

In general, SSH is a cryptographic network protocol for using network services securely over an unsecured network by using public key encryption to authenticate remote computers to users. SSH connects clients to servers using a layered protocol suite comprising the main components of a transport layer that provides server authentication, confidentiality, and integrity; a user authentication protocol that validates the user to the server; and a connection protocol that multiplexes the encrypted tunnel into multiple logical communication channels. SSH is used for a variety of different applications, including remote login operations, file transfers, and even virtual private network (VPN) implementation.

In an embodiment, the programs or software that is negotiated comprise the algorithms that are used for SSH communication protocols, and maybe referred to as "algorithms" or as "programs." Such algorithms or programs typically perform one or more negotiations to help the client and server establish protocols and operating parameters (e.g., encryption method, digital certificates, session keys, etc.) to securely exchange data over a network. Operations such as handshake routines to exchange keys may be used to establish such communications.

In encryption-based security, a host key is s cryptographic key used for authenticating computers under protocols, such as SSH. Key exchange is a method by which the cryptographic keys are exchanged between two computers to allow the use of a cryptographic algorithm. Various different exchange methods are possible, such as Diffie-Hellman (D-H), Elliptic Curve D-H, Rivest-Shamir-Adleman (RSA) series, web of trust, password authenticated key agreement, quantum key exchange, and others.

Figure 2:
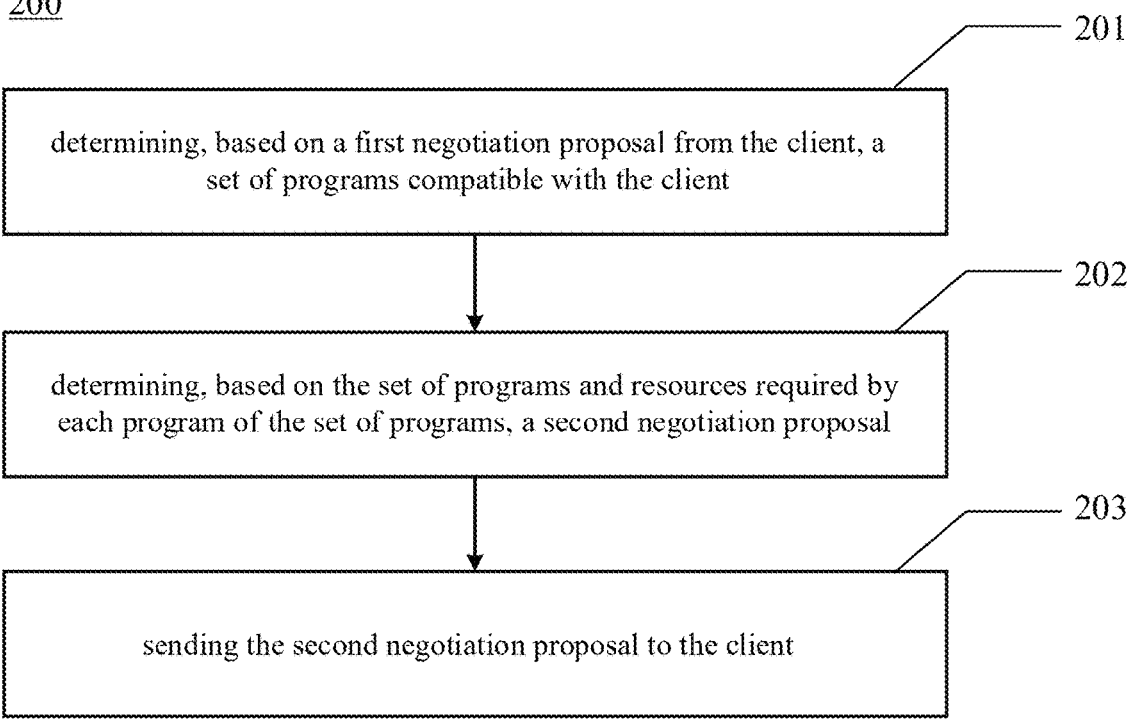
FIG. 2 is a flowchart illustrating a method for controlling network access, under some embodiments.

FIG. 2 is a flowchart illustrating a method for controlling network access, under some embodiments. This method in illustration 200 may be performed by component 102 as illustrated in FIG. 1. In block 201, component 102 determines, based on a first negotiation proposal from client 101, a set of programs compatible with client 101. In an embodiment, component 102 receives a proposal from client 101 and extracts proposed programs from this proposal. The programs extracted from this proposal will be compatible with client 101. The proposed programs may include key exchange, host key, encryption, and/or integrity. In an example, determination of the set of programs compatible with client 101 is made with extra consideration of security levels of different algorithms. In this way, the set of programs would be both secure and compatible with client 101.

In block 202, component 102 determines, based on the set of programs and resources required by each program of the set of programs, a second negotiation proposal. For purposes of description, the term 'resources' generally refers to computing resources, such as CPU and/or memory. In one example, the amount of resources required by each program can be determined in terms of time length. Given a particular set of hardware (CPU and/or memory), it takes different lengths of time to execute different programs or algorithms. The shorter the time taken, the less resources required by the program. In other embodiments, resources may also be extended to include network bandwidth co-processor and other component capabilities, system overhead, and so on.

Programs for key exchange and host key use asymmetric cryptography, and thus both have high resource requirements. Therefore, component 102 would be overloaded when communications with a large number of clients occur at the same time. In one embodiment, component 102 determines a resource efficient program among the set of programs compatible with client 101, then component 102 uses the resource efficient program for the second negotiation proposal. Resource efficient programs refer to programs that require less resources than other programs. The most resource efficient programs require the least resources. Measurements of resource efficiency may be measured and expressed as a percentage or similar scaled measure, such as 0 to 100% of capacity, 1 to 10 on a linear scale, and so on. For example, a program or encryption algorithm that momentarily requires one-quarter of a CPU's processing bandwidth is twice as efficient as one that requires half of the CPU. Efficiency may be determined by any appropriate means, such as empirical usage statistics, industry knowledge, manufacturer statistics, and so on. During operation, one or more system applications or utilities may be used to dynamically measure efficiency of running programs per component or resource.

It should be noted that the most resource efficient programs could be different when component 102 acts as a proxy server 103 and acts as a proxy client 104. For example, Elliptic Curve is one of the most resource efficient algorithms when component 102 acts as a proxy server 103; but this is not necessarily the case when component 102 acts as a proxy client 104. For key exchanges, Elliptic Curve is one of the most resource efficient algorithms, and Diffie Hellman with Group Exchange is another efficient algorithm. For the host key, however, Elliptic Curve remains a resource efficient algorithm, but RSA series is another efficient algorithm.

In one embodiment, component 102 uses a predefined list of programs sequenced from the most resource efficient to the least resource efficient and compares the set of programs compatible with client 101 with the predefined list. In another embodiment, component 102 picks the predefined program with the most resource efficient, such as Elliptic Curve, and checks if it is included in the set of programs proposed by client 101. If not, component 102 may pick a second most resource efficient program, such as Diffie Hellman with Group Exchange, and check if it is included in the set of programs proposed by client 101. Component 102 may repeat this process until finds the most resource efficient program among the set of programs compatible with client 101 for both key exchange and host key.

In block 203, component 102 sends the second negotiation proposal to client 101. Here, the second negotiation proposal uses the most resource efficient program rather than providing a whole list of programs (e.g., the set of programs compatible with client 101) with different resource requirements. In this way, client 101 is forced to choose the most resource efficient program for the subsequent communications with component 102. Therefore, this embodiment reduces resource usage on the component 102 side and avoids overload or resource usage when there are large number or scale of clients communicating with component 102 at the same time. In an embodiment, the most resource efficient program may be one that is determined during present execution of the program as compared to other programs. It may also be one that is defined to be most efficient based on knowledge or empirical evidence (e.g., a later version of D-H may be known to run faster than an earlier version, and so on). Programs may be rated in terms of efficiency from most or more efficient to less or not efficient. Such a rating may be along a defined scale (e.g., 0-10) or based on a comparison with a given threshold for the resource (e.g., greater or less than 50% usage of the resource).

After block 203, client 101 further establishes connections with component 102 through standard process of relevant protocols such as SSH protocol. Component 102 acts as a proxy client 104 to establish connections with server 105. Because server 105 is within the internal network and it is less likely to be attacked by threats, component 102 could give more weight to resource requirement than security when it chooses algorithms of a negotiation proposal. Specific example embodiments will be further described below.

The negotiation process between client 101 and component 102 and the negotiation process between component 102 and server 105 will be further described below with reference to FIG. 3. FIG. 3 is a SSH protocol diagram illustrating establishing SSH connection between a client and MiTM, under an example embodiment. It should be noted that illustration 300 is an example of implementing this invention and is not meant to limit the scope of protection.

In illustration 300, MiTM 312 is an example of component 102 and is configured between SSH client 311 and SSH server 313. MiTM 312 enables network connection between SSH client 311 and SSH server 313, even if SSH client 311 and SSH server 313 are installed with different versions of software, by serving as a proxy between them and providing different sets of algorithms for algorithms negotiation.

Step 301, SSH client 311 sends its SSH protocol and software version to MiTM 312. Step 302, MiTM 312 sends its SSH protocol and software version back to SSH client 311. Step 303, SSH client 311 initiates a negotiation process by sending SSH2_MSG_KEXINIT to MiTM 312, which indicates the algorithms proposal of SSH client 311. Step 304, MiTM 312 determines a negotiation proposal with considerations of resource requirement of each algorithm. As described above, a negotiation proposal may include proposals for key exchange, host key, encryption, and integrity. MiTM 312 determines a set of algorithms compatible with SSH client 311 based on the algorithm proposal of SSH client 311. The process of determining a negotiation proposal of MiTM 312 involves choosing a resource efficient algorithm among the set of algorithms. Example embodiments for choosing a resource efficient algorithm are as described above.

In step 305, MiTM 312 sends SSH2_MSG_KEXINIT to SSH client 311, which indicates resource efficient algorithms to be used for negotiation. The establishment of the SSH connection between SSH client 311 and MiTM 312, after step 305, may be completed in accordance with the standard protocol process of SSH. After a connection with SSH client 311 has been established, MiTM 312 acts as a proxy client and initiates connection with SSH server 313.

In step 306, MiTM 312 sends its SSH protocol and software version to SSH server 313. Step 307, SSH server 313 sends its SSH protocol and software version to MiTM 312. Step 308, SSH server 313 sends SSH2_MSG_KEXINIT to MiTM 312 to initiate a negotiation process, which indicates the algorithms proposal of SSH server 313. In step 309, MiTM 312 determines a negotiation proposal with considerations of resource requirement of each algorithm. This process is the same as step 304. In step 310, MiTM 312 sends SSH2_MSG_KEXINIT to SSH server 313, which indicates resource efficient algorithms to be used for negotiation. The SSH connection between MiTM 312 and SSH server 313, after step 305, may then be completed in accordance with the standard protocol process of SSH.

In an embodiment, step 305 goes before step 303, MiTM 312 uses a list of algorithms as a negotiation proposal. The list of algorithms is sequenced based on the resource requirement of each algorithm, with the most resource efficient algorithm being the first one in the list. In this way, SSH client 311 and MiTM 312 may both choose the first algorithm in the list that is compatible with both of them.

In an embodiment, the second negotiation proposal includes a key exchange proposal. If the resource efficient program for the key exchange proposal is Diffie Hellman with Group Exchange, component 102 optimizes resource usage by choosing a prime size of the Diffie Hellman with Group Exchange. After client 101 and component 102 determine to use Diffie Hellman with Group Exchange for key exchange through the above negotiation process, they need to determine a prime size for Diffie Hellman with Group Exchange through a DH group exchange process.

In general, the smaller the prime size, the less secure the algorithm, but at the same time, the less resource is required by the algorithm. Thus, component 102 tends to choose a smaller prime size when the upcoming resource demand is higher. The client 101 proposal for prime size typically includes a minimal size and a maximum size, wherein the minimal size indicates its basic security requirement. Component 102 chooses a prime size between the minimal size and the maximum based on the resource demand on component's 102 side. In an example embodiment, component 102 determines the prime size by using a predictive means. Specifically, component 102 determines an upcoming resource demand on the component 102 side by using a predictive model and chooses a prime size based on the upcoming resource demand. In this way, the prime size chosen will satisfy the requirements both for security and for avoiding overload on the component 102 side. This process will be further described below with reference to FIG. 4.

Figure 4:
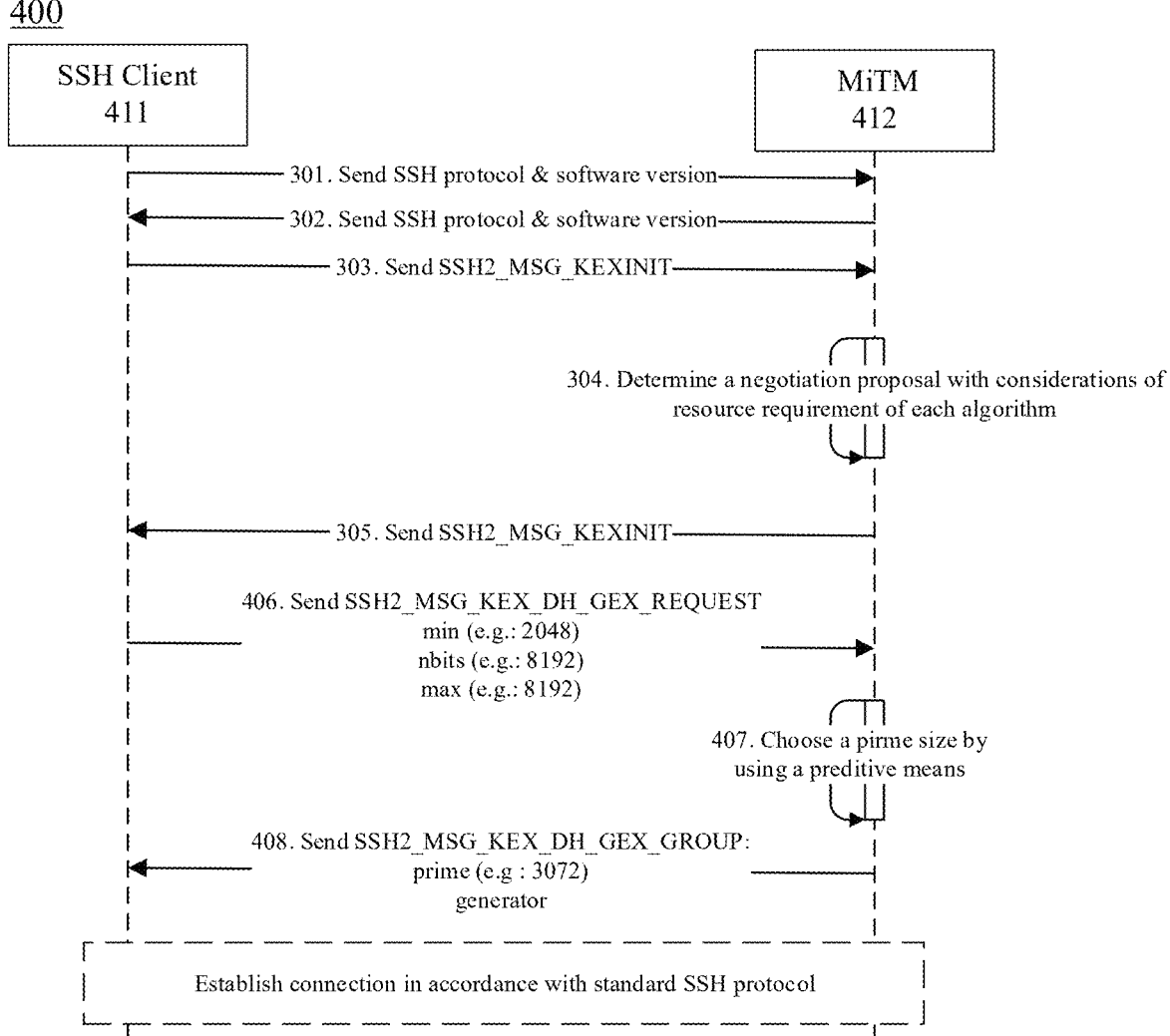
FIG. 4 is SSH protocol diagram illustrating establishing SSH connection between a client and MiTM, under another example embodiment.

FIG. 4 is an SSH protocol diagram illustrating establishing SSH connection between a client and MiTM, under another example embodiment. In illustration 400, MiTM 412 is an example of component 102. The process of step 301 to step 305 is as has been described above with reference to FIG. 3. In step 406 of FIG. 4, SSH client 411 sends SSH2_MSG_KEX_DH_GEX_REQUEST to MiTM 412, which is DH key exchange request and indicates a minimal size of 2048 bits and a maximum size of 8192 bits (as an example). In step 407, MiTM 412 chooses a prime size between the minimal size and the maximum size by using a predictive means. In an example embodiment, component 102 could calculate a prime size based on a predefined table which indicates an optimal prime size for different idle CPU ratio of component 102.

In illustration 400, the workload on the component 102 side will be relatively high as predicted by the predictive means. Thus, component 102 chooses a prime size, e.g., 3072 bits, slightly bigger than the minimal size. Step 408, component 102 sends SSH2_MSG_KEX_DH_GEX_GROUP to SSH client 411, which includes the prime size chosen. In this way, MiTM 412 can accommodate the security requirements of SSH client 411 without overload.

In an embodiment, component 102 monitors resource usage on its side and generates a historical record of the resource usage. The historical record can be used to train the predictive model, and the predictive model is used to predict the upcoming resource demand on component's 102 side. In an example, this process can be carried out by collaborating with other devices outside component 102, which will be further described below with reference to FIG. 5.

Figure 5:
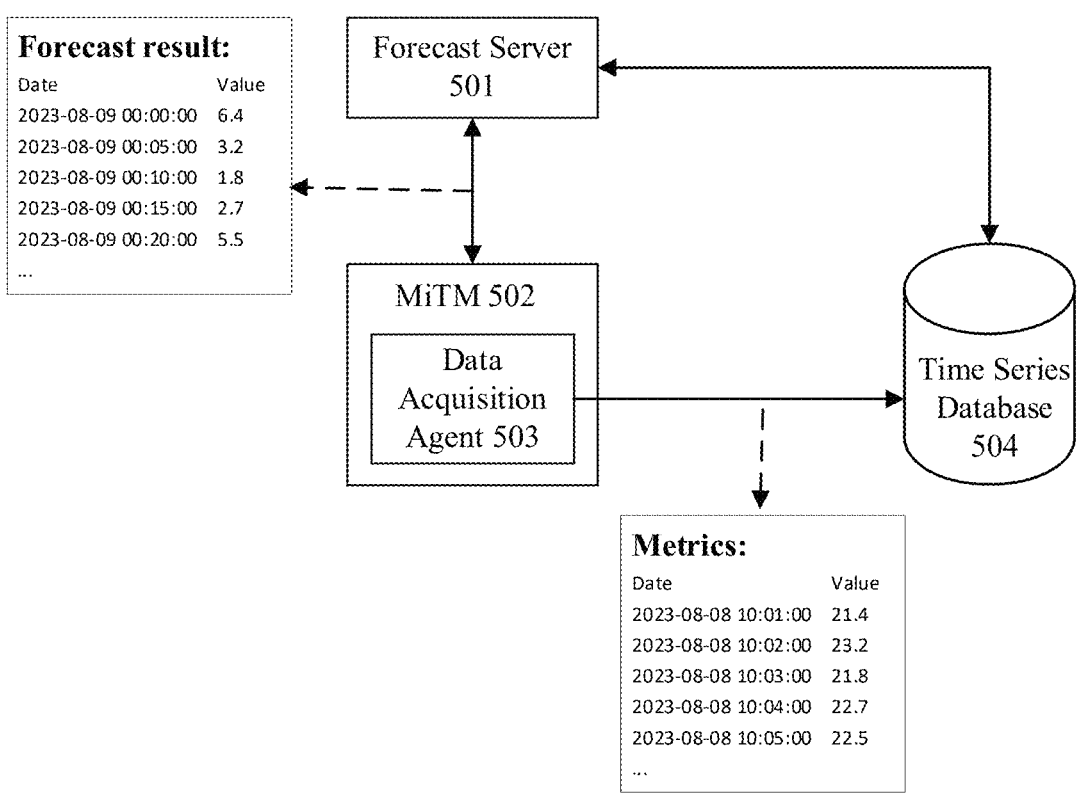
FIG. 5 is diagram illustrating a predictive means process under an example embodiment.

FIG. 5 is diagram illustrating a predictive means method, under an example embodiment. A data acquisition agent 503 is configured at MiTM 502, which functions to monitor and record resource usage of MiTM 502. The historical record could be in the form of a list of the amount of resources used at different times. The historical record can be stored in time series database 504 and be retrieved and used by forecast server 501 to train the predictive model. Forecast server 501 predicts the upcoming resource demand and sends it to MiTM 502. The predictive model used by forecast server 501 could be Meta Prophet, Holt-Winters, Long Short Term Memory, or the like.

In an embodiment, MiTM 502 uses a fallback mechanism if the prediction is not as accurate. Assuming that the time interval of the historical record is five minutes, if the actual last minute CPU usage is lower than predicted, MiTM 502 will calculate the prime size according to the predefined table and the upcoming resource demand predicted. If, however, the actual last minute CPU usage is above a threshold, say 90%, the fallback mechanism is triggered and MiTM 502 will ignore the prediction by the forecast server 501 and choose to use the minimal prime size proposed by the client.

Figure 6:
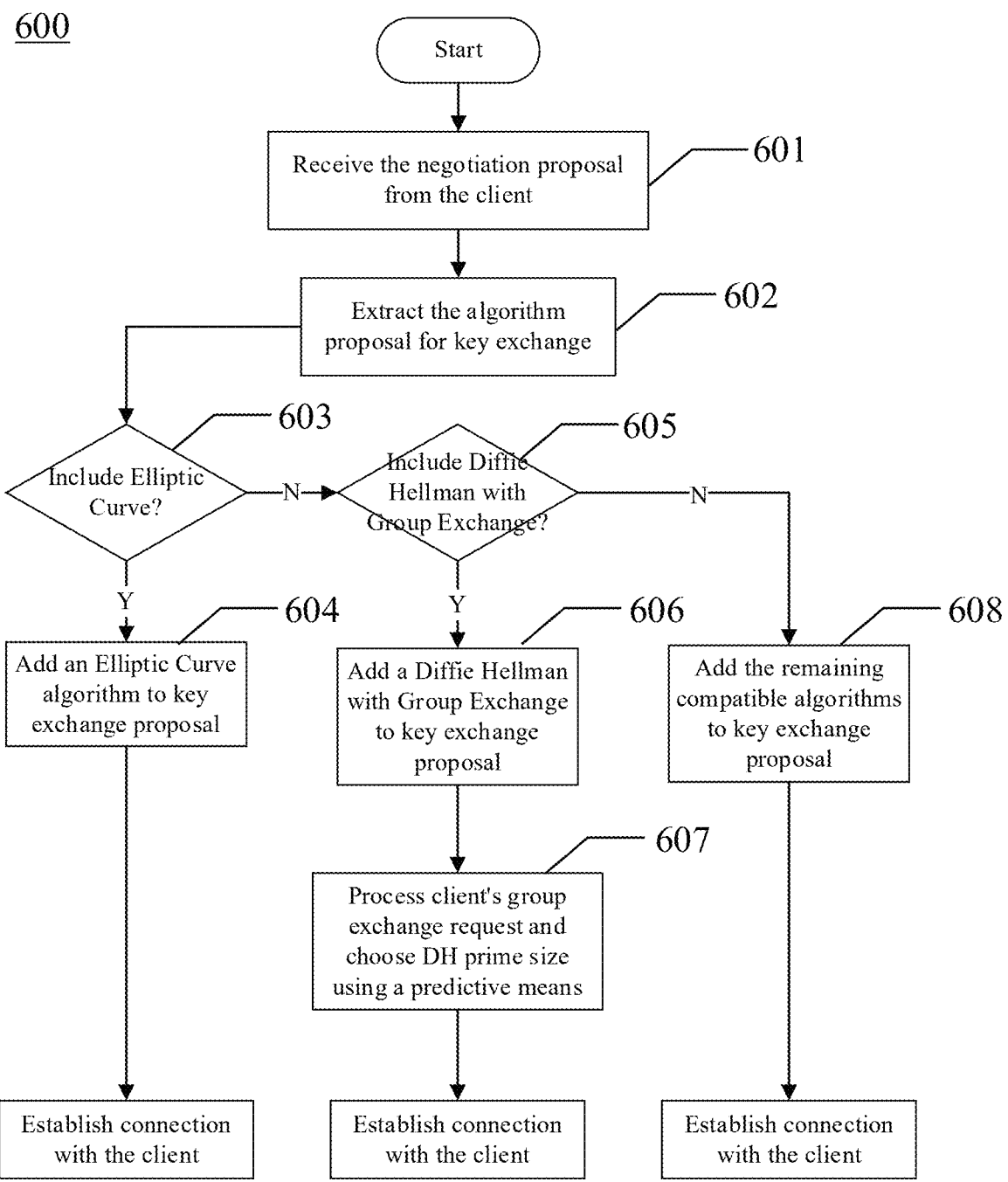
FIG. 6 is a flowchart illustrating the process of determining a resource efficient program for key exchange by component 102, under an example embodiment.

FIG. 6 is a flowchart illustrating the process of determining a resource efficient program for key exchange by component 102, under an example embodiment. In step 601, component 102 receives the negotiation proposal from client 101. In step 602, component 102 extracts the algorithm proposal for key exchange. Component 102 can determine a set of algorithms compatible with client 101 based on the key exchange algorithm proposal. In step 603, component 102 determines whether this set of algorithms includes Elliptic Curve algorithms. For step 604, if including Elliptic Curve algorithms as determined in 603, component 102 adds an Elliptic Curve algorithm, which could be the first one or any one of Elliptic Curve algorithms, to its key exchange proposal.

For step 605, if not including Elliptic Curve algorithms as determined in 603, component 102 further determines whether this set of algorithms includes Diffie Hellman with Group Exchange algorithms. If so, in step 606 component 102 adds an algorithm of Diffie Hellman with Group Exchange, which could be the first or any one of Diffie Hellman with Group Exchange algorithms, to its key exchange proposal. In step 607, component 102 processes the client's group exchange request and chooses a DH prime size using a predictive means, as has been described above. In step 608, if not including Diffie Hellman with Group Exchange algorithms as determined in 605, component 102 adds the remaining compatible algorithms, such as Diffie Hellman with Specific Group, to its key exchange proposal.

Figure 7:
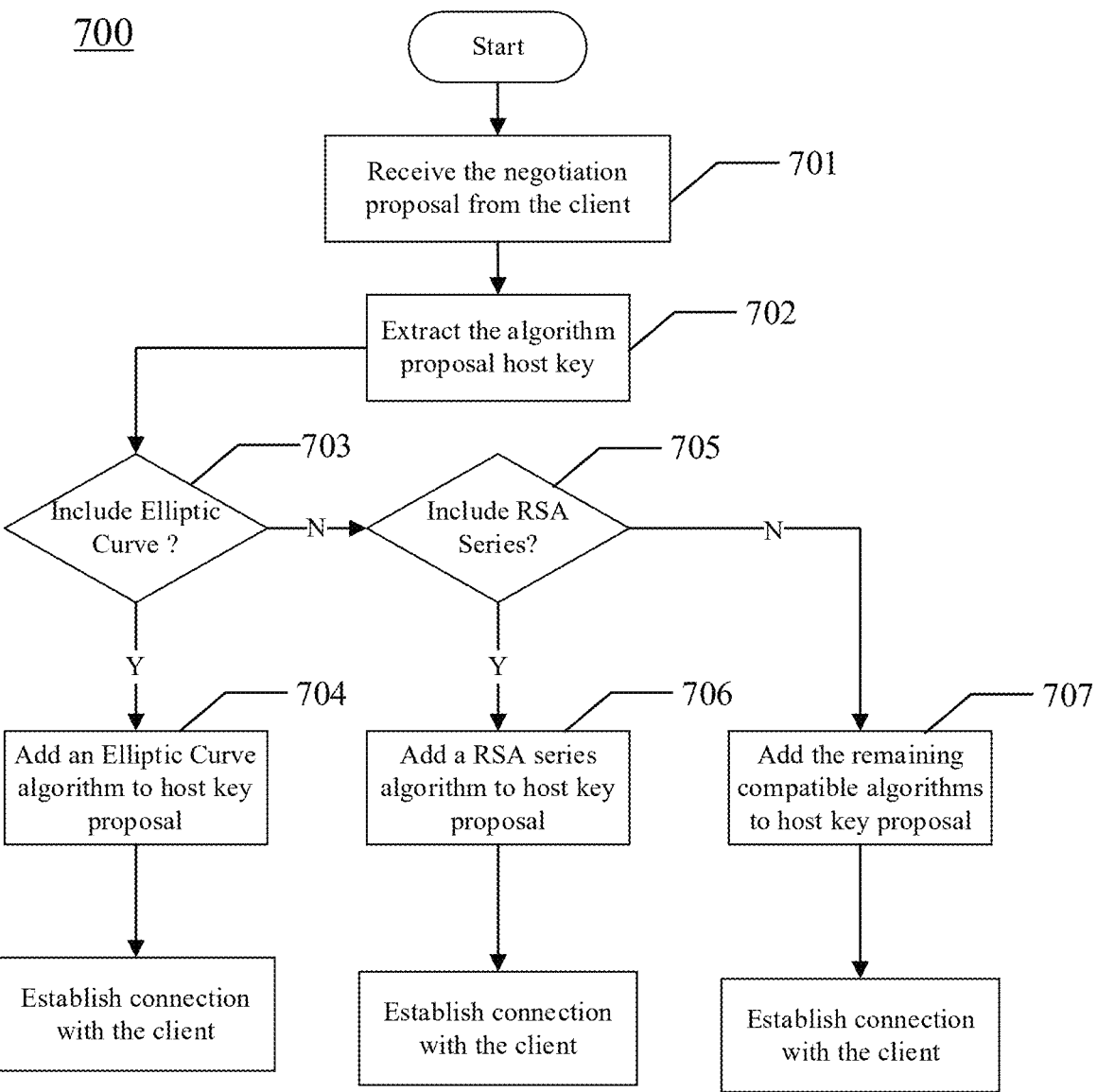
FIG. 7 is a flowchart illustrating the process of determining a resource efficient program for host key by component 102, under an example embodiment.

FIG. 7 is a flowchart illustrating the process of determining a resource efficient program for host key by component 102, under an example embodiment. In step 701, component 102 receives the negotiation proposal from client 101. In step 702, component 102 extracts the algorithm proposal for host key. Component 102 can determine a set of algorithms compatible with client 101 based on the host key algorithms proposal. In step 703, component 102 determines whether or not this set of algorithms includes Elliptic Curve algorithms. If so, in step 704 component 102 adds an Elliptic Curve algorithm, which could be the first or any one of Elliptic Curve algorithms, to its host key proposal.

If not including Elliptic Curve algorithms as determined in 703, component 102 further determines whether this set of algorithms includes RSA series algorithms, 705. In step 706, if including RSA series algorithms as determined in 705, component 102 adds an RSA series algorithm, which could be the first or any one of RSA series algorithms, to its host key proposal. If not including RSA series algorithms, as determined in 705 component 102 adds the remaining compatible algorithms to its host key proposal, 707.

A connection is then established with the client after each of steps 704, 706, and 707, as shown.

Figure 8:
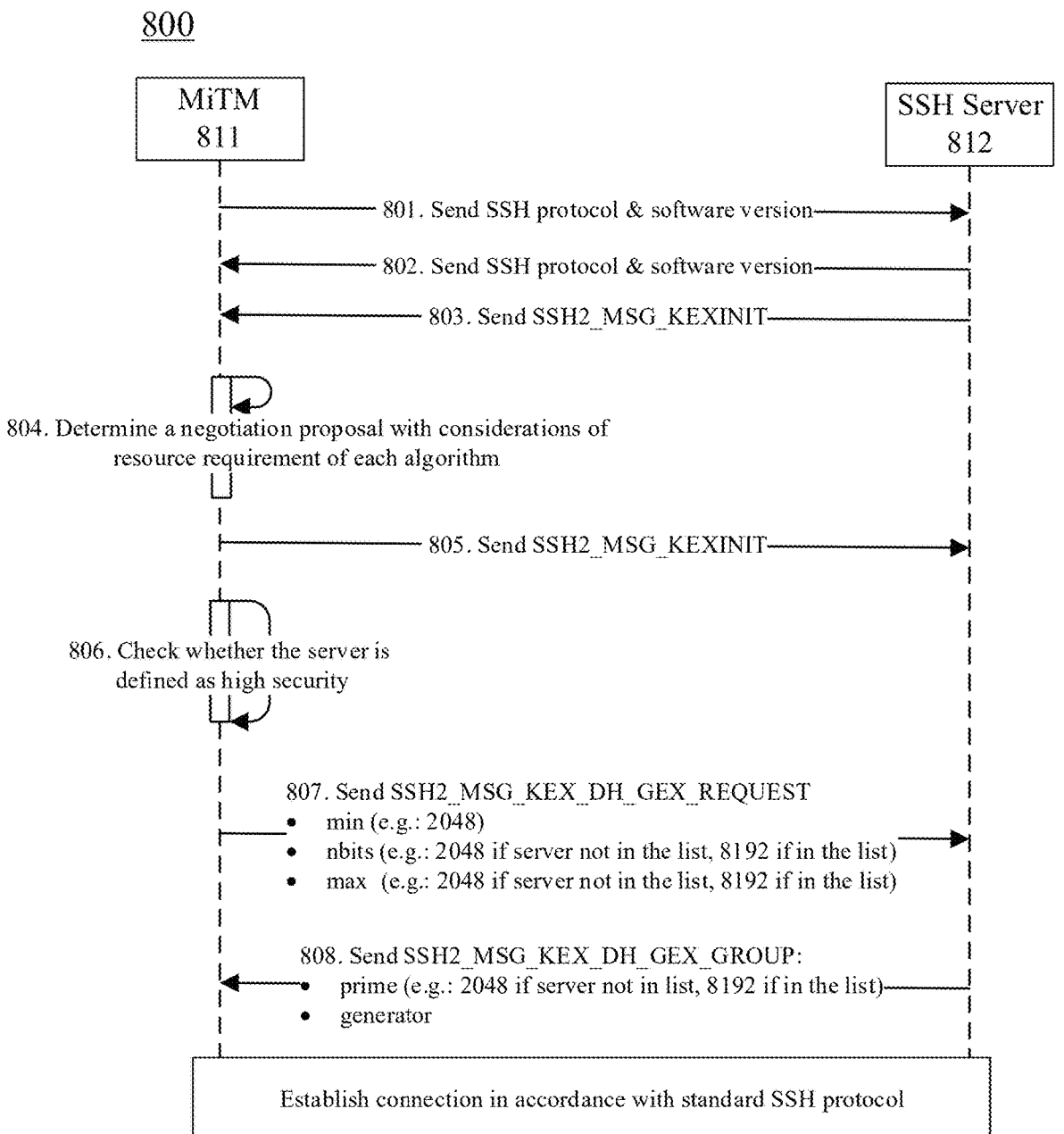
FIG. 8 is a SSH protocol diagram illustrating establishing SSH connection between MiTM and SSH server, under an example embodiment.

FIG. 8 is a SSH protocol diagram illustrating establishing SSH connection between MiTM and SSH server, under an example embodiment. Component 102 acts as a proxy client 104 communicating with server 105, and MiTM 811 is an example of component 102. In step 801, MiTM 811 sends its SSH protocol and software version to SSH server 812. In step 802, SSH server 812 sends its SSH protocol and software version back to MiTM 811. In step 803, SSH Server 812 initiates a negotiation process by sending SSH2_MSG_KEXINIT to MiTM 811, which indicates the algorithms proposal of SSH server 812. In step 804, MiTM 811 determines a negotiation proposal with considerations of resource requirement of each algorithm.

As described above, a negotiation proposal may include proposals for key exchange, host key, encryption, and integrity. MiTM 811 determines a set of algorithms compatible with SSH server 812 based on the algorithm proposal of SSH server 812. The process of determining a negotiation proposal of MiTM 811 involves choosing a resource efficient algorithm among the set of algorithms. Example embodiments for choosing a resource efficient algorithm are similar to embodiments described above. The difference is that RSA, rather than Elliptic Curve, is the most resource efficient program when MiTM 811 acts as a proxy client in illustration 800. Thus, MiTM 811 would use RSA for negotiation if it is within the set of algorithms compatible with MiTM 811. If there is no RSA within the set of algorithms compatible with MiTM 811, MiTM 811 would choose Elliptic Curve instead, if possible. In step 805, MiTM 811 sends SSH2_MSG_KEXINIT to SSH server 812, which indicates resource efficient algorithms to be used for negotiation.

In step 806, in cases of that the resource efficient algorithm is Diffie Hellman with Group Exchange, MiTM 811 checks whether SSH server 812 is within a list of servers which are configured as high security. If SSH server 812 is not configured as high security, MiTM 811 chooses a smallest prime size of the Diffie Hellman with Group Exchange. Otherwise, component 102 chooses a prime size based on the predictive means described above. In step 807, MiTM 811 sends SSH2_MSG_KEX_DH_GEX_REQUEST to SSH server 812. This message indicates the minimal size and maximum size both as 2048 bits (for example) when the SSH server 812 is not in the list. If SSH server 812 is in the list, this message indicates the minimal size as 2048 bits and maximum size as 8192 bits. In step 808, SSH server 812 sends SSH2_MSG_KEX_DH_GEX_GROUP to MiTM 811. This message indicates the prime size as 2048 bits if SSH server 812 is not in the list; otherwise, it indicates the prime size as 8192 bits. The establishment of the SSH connection between SSH server 812 and MiTM 811, after step 808, may be completed in accordance with the standard protocol process of SSH.

In an embodiment, step 805 goes before step 803, MiTM 811 uses a list of algorithms as a negotiation proposal. The list of algorithms is sequenced based on the resource requirement of each algorithm, with the most resource efficient algorithm being the first one in the list. In this way, SSH server 812 and MiTM 811 may both choose the first algorithm in the list that is compatible with both of them.

As described above, embodiments include a component that acts as a client or server proxy and utilizes certain secure network protocols to flexibly implement network access control. Such a component may be implemented as a computer implemented software process, or as a hardware component, or both in a computing device such as a gateway. As such, it may be an executable module executed by the one or more computers in the network, or it may be embodied as a hardware component or circuit provided in the system. The network environment may comprise any number of components coupled over the Internet or similar large-scale network or portion thereof. Each node in the network(s) comprises a computing device capable of executing software code to perform the processing steps described herein.

Figure 9:
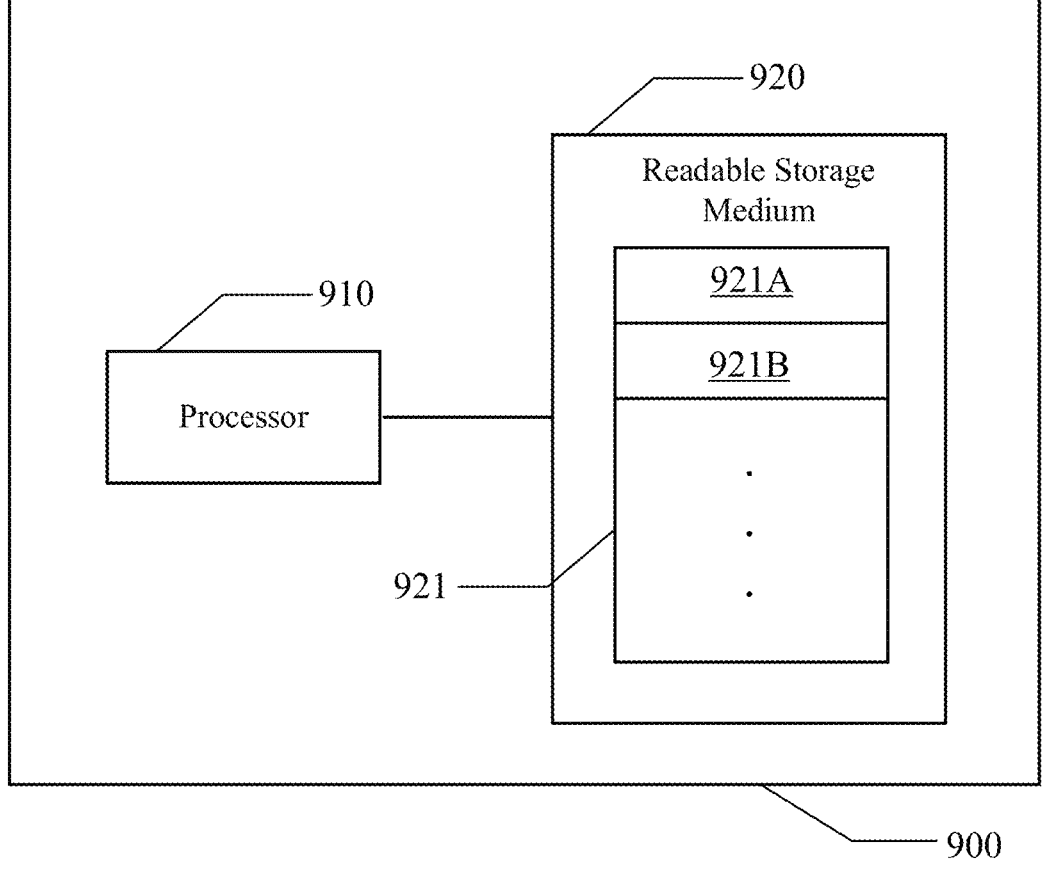
FIG. 9 is a block diagram of an apparatus for controlling network access under some embodiments.

FIG. 9 is a block diagram of an apparatus for controlling network access under some embodiments. As shown in FIG. 9, apparatus 900 includes a processor 910 and a computer-readable storage medium 920. Processor 910 is one of the specific embodiments of component 102. Other components, such as input/output (I/O) interfaces, buffers, power circuits, and so on, may also be used as known by those of ordinary skill in the art. Apparatus 900 may be configured to perform any or all of the methods described above with reference to FIG. 1 to FIG. 8.

Processor 910 may include, for example, general purpose microprocessors, instruction set processors and/or associated chipsets and/or reconfigurable processors and/or special purpose microprocessors (for example, application specific integrated circuits (ASICs)), and the like. Processor 910 may also include an on-board memory for cache usage. Processor 910 may be a single processing unit or a plurality of processing units for performing different actions of the method flow according to the embodiments of the present disclosure described with reference to FIG. 1 to FIG. 8.

The computer-readable storage medium 920 may be any medium that may contain, store, communicate, propagate, or transport instructions. For example, readable storage medium 920 may include but is not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Computer-readable storage media 920 may include a computer program 921 that may include code/computer-executable instructions that, when executed by processor 910, cause the processor 910 to perform, for example, the method flows described above in connection with FIGS. 1 to 8 and any variations thereof.

Computer program 921 may be configured with computer program codes, including, for example, computer program modules. For example, in an example embodiment, the codes in the computer program 921 may include one or more program modules including, for example, a module 921A, a module 921B, etc. It should be noted that the division manner and the number of modules are not fixed, and those skilled in the art may use appropriate program modules or combination of program modules according to actual situations. When these program module combinations are executed by processor 910, processor 910 may perform the method flow described above in connection with FIG. 1 to FIG. 8 and any variations thereof.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "controller" as used herein may refer to any of the foregoing structure or any other structure suitable for implementation of the techniques described herein. Furthermore, the techniques could be fully implemented in one or more circuits or logic elements.

The techniques of described embodiments may be implemented in a wide variety of devices or apparatuses, including an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for controlling network access, executed by a component between a client and a server, comprising:
    defining resource efficiency of a program in terms of minimal comparative use of computing resources including CPU bandwidth and memory usage based on execution time;
    determining, based on a first negotiation proposal from the client, a set of programs for use in cryptographic key exchange compatible with the client, wherein the set of programs comprises Diffie Hellman with Group Exchange, Elliptic Curve, and RSA series;

determining, based on the set of programs and resources required by each program of the set of programs, a second negotiation proposal by determining a resource efficient program among the set of programs, using the resource efficient program for the second negotiation proposal; and sending the second negotiation proposal to the client.

2. The method of claim 1, wherein the second negotiation proposal includes a key exchange proposal, further comprising:

optimizing resource usage, if the resource efficient program for the key exchange proposal is the Diffie Hellman with Group Exchange, by choosing a prime size of the Diffie Hellman with Group Exchange.

3. The method of claim 2, wherein choosing a prime size of the Diffie Hellman with Group Exchange further comprises:

determining an upcoming resource demand on the component's side by using a predictive model; and choosing the prime size based on the upcoming resource demand.

4. The method of claim 3, further comprising:

monitoring resource usage on the component's side;

generating a historical record of the resource usage; and training the predictive model by using the historical record of the resource usage.

5. The method of claim 3, wherein choosing the prime size based on the upcoming resource demand further comprising:

choosing a smaller prime size when the upcoming resource demand is higher.

6. The method of claim 1, further comprising:

sending a third negotiation proposal to the server, wherein the third negotiation proposal includes a key exchange proposal of Diffie Hellman with Group Exchange; and choosing a smallest prime size of the Diffie Hellman with Group Exchange.

7. The method of claim 1, further comprising:

sending a fourth negotiation proposal to the server, wherein the fourth negotiation proposal includes a key exchange proposal of Diffie Hellman with Group Exchange;

determining whether the server is predefined as high security; and choosing a smallest prime size of the Diffie Hellman with Group Exchange if the server is not predefined as high security.

8. The method of claim 1, wherein the component is a man in the middle which acts as a proxy server communicating with the client or acts as a proxy client communicating with the server.

9. An apparatus for controlling network access, wherein the apparatus is between a client and a server, comprising:

one or more processors; and a memory for storing one or more programs;

wherein the one or more programs, when executed by the one or more processors, cause the one or more processors to perform operations comprising:

defining resource efficiency of a program in terms of minimal comparative use of computing resources including CPU bandwidth and memory usage based on execution time;

determining, based on a first negotiation proposal from the client, a set of programs for use in cryptographic key exchange compatible with the client, wherein the set of programs comprises Diffie Hellman with Group Exchange, Elliptic Curve, and RSA series;

determining, based on the set of programs and resources required by each program of the set of programs, a second negotiation proposal by determining a resource efficient program among the set of programs, using the resource efficient program for the second negotiation proposal; and sending the second negotiation proposal to the client.

10. The apparatus of claim 9, wherein the second negotiation proposal includes a key exchange proposal, and the one or more programs, when executed by the one or more processors, cause the one or more processors to perform operations further comprising:

optimizing resource usage, if the resource efficient program for the key exchange proposal is the Diffie Hellman with Group Exchange, by choosing a prime size of the Diffie Hellman with Group Exchange.

11. The apparatus of claim 10, wherein the one or more programs, when executed by the one or more processors, cause the one or more processors to perform operations further comprising:

determining an upcoming resource demand on the component's side by using a predictive model; and choosing the prime size based on the upcoming resource demand.

12. The apparatus of claim 11, wherein the one or more programs, when executed by the one or more processors, cause the one or more processors to perform operations further comprising:

monitoring resource usage on the component's side;

generating a historical record of the resource usage; and training the predictive model by using the historical record of the resource usage.

13. The apparatus of claim 11, wherein the one or more programs, when executed by the one or more processors, cause the one or more processors to perform operations further comprising:

choosing a smaller prime size when the upcoming resource demand is higher.

14. The apparatus of claim 9, wherein the one or more programs, when executed by the one or more processors, cause the one or more processors to perform operations further comprising:

sending a third negotiation proposal to the server, wherein the third negotiation proposal includes a key exchange proposal of Diffie Hellman with Group Exchange; and choosing a smallest prime size of the Diffie Hellman with Group Exchange.

15. The apparatus of claim 9, wherein the one or more programs, when executed by the one or more processors, cause the one or more processors to perform operations further comprising:

sending a fourth negotiation proposal to the server, wherein the fourth negotiation proposal includes a key exchange proposal of Diffie Hellman with Group Exchange; determining whether the server is predefined as high security; and choosing a smallest prime size of the Diffie Hellman with Group Exchange if the server is not predefined as high security.

16. The apparatus of claim 9, wherein the apparatus is a man in the middle which acts as a proxy server communicating with the client or acts as a proxy client communicating with the server.

17. A computer-readable storage medium storing instructions thereon that when executed cause one or more processors to:

define resource efficiency of a program in terms of minimal comparative use of computing resources including CPU bandwidth and memory usage based on execution time;

determine, based on a first negotiation proposal from the client, a set of programs for use in cryptographic key exchange compatible with the client, wherein the set of programs comprises Diffie Hellman with Group Exchange, Elliptic Curve, and RSA series;

determine, based on the set of programs and resources required by each program of the set of programs, a second negotiation proposal by determining a resource efficient program among the set of programs, using the resource efficient program for the second negotiation proposal; and send the second negotiation proposal to the client.

\* \* \* \* \*